(12) United States Patent
Asakura et al.

(10) Patent No.: US 10,054,455 B2
(45) Date of Patent: Aug. 21, 2018

(54) VEHICLE CONTROLLER, VEHICLE CONTROL METHOD, AND VEHICLE CONTROL PROGRAM

(71) Applicant: HONDA MOTOR CO., LTD., Tokyo (JP)

(72) Inventors: Masahiko Asakura, Wako (JP); Hitoshi Konishi, Wako (JP); Hironobu Kiryu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 93 days.

(21) Appl. No.: 15/202,945

(22) Filed: Jul. 6, 2016

(65) Prior Publication Data

US 2017/0010612 A1 Jan. 12, 2017

(30) Foreign Application Priority Data

Jul. 7, 2015 (JP) .................. 2015-136268

(51) Int. Cl.
| | |
|---|---|
| *G01C 22/00* | (2006.01) |
| *G05D 1/00* | (2006.01) |
| *G01C 21/34* | (2006.01) |
| *B60W 30/00* | (2006.01) |
| *G08G 1/0967* | (2006.01) |

(Continued)

(52) U.S. Cl.
CPC ......... *G01C 21/3461* (2013.01); *B60W 30/00* (2013.01); *G01C 21/3415* (2013.01); *G01S 13/865* (2013.01); *G01S 13/87* (2013.01); *G01S 13/931* (2013.01); *G01S 17/023* (2013.01); *G01S 17/936* (2013.01); *G06K 9/00825* (2013.01); *G08G 1/09675* (2013.01); *G08G 1/096725* (2013.01); *G08G 1/096783* (2013.01); *G01S 2013/936* (2013.01); *G01S 2013/9357* (2013.01); *G01S 2013/9375* (2013.01); *G01S 2013/9378* (2013.01); *G01S 2013/9389* (2013.01)

(58) Field of Classification Search
CPC .. B60W 30/00; G01C 21/3415; G01S 13/865; G01S 13/87; G01S 13/931; G01S 17/023; G01S 17/936; G06K 9/00791; G08G 1/096725; G08G 1/09675; G08G 1/096783
USPC .......................................................... 701/25
See application file for complete search history.

(56) References Cited

FOREIGN PATENT DOCUMENTS

| | | |
|---|---|---|
| JP | 2011-118603 A | 6/2011 |
| JP | 2013-122720 A | 6/2013 |
| JP | 2015-028812 A | 2/2015 |

OTHER PUBLICATIONS

Office Action dated Apr. 4, 2017, issued in counterpart Japanese Patent Application No. 2015-136268, with English translation. (8 pages).

*Primary Examiner* — Maceeh Anwari
(74) *Attorney, Agent, or Firm* — Westerman, Hattori, Daniels & Adrian, LLP

(57) ABSTRACT

The present disclosure provides a vehicle controller which includes an identification unit that identifies an operation state of a traffic signal existing on a route up to a destination; a setting unit that sets an automated drive mode section on the route based on the operation state of the traffic signal identified by the identification unit, the automated drive mode section being a section where an automated drive mode of controlling acceleration, deceleration, or steering is permitted during travelling of a vehicle; and a travel control unit that controls the travelling of the vehicle in the automated drive mode in the automated drive mode section set by the setting unit.

10 Claims, 13 Drawing Sheets

(51) Int. Cl.
*G01S 17/02* (2006.01)
*G01S 17/93* (2006.01)
*G01S 13/86* (2006.01)
*G01S 13/87* (2006.01)
*G01S 13/93* (2006.01)
*G06K 9/00* (2006.01)

VEHICLE CONTROLLER, VEHICLE CONTROL METHOD, AND VEHICLE CONTROL PROGRAM

CROSS REFERENCES TO RELATED APPLICATIONS

The present application claims priority under 35 U.S.C. § 119 to Japanese Patent Application No. 2015-136268, filed Jul. 7, 2015, entitled "Vehicle Controller, Vehicle Control Method, and Vehicle Control Program." The contents of this application are incorporated herein by reference in their entirety.

BACKGROUND

1. Field

The present disclosure, relates to a vehicle controller, a vehicle control method, and a vehicle control program.

2. Description of the Related Art

In recent years, there has been a demand for a technique of automatically controlling acceleration, deceleration and steering of a vehicle in a section including a diverging point or a merging point of a toll road such as an expressway. In this connection, in one of known techniques, a vehicle controller that performs automatic control drive according to road conditions based on the present position of a vehicle is provided with a navigation device that performs a processing for cancelling the automated control drive, when finding that the vehicle is at a point where the position detection accuracy of the vehicle drops due to difficulty of receiving the global positioning system (GPS) radio wave, such as a road inside a tunnel or a parking lot inside a building (for example, see Japanese Unexamined Patent Application Publication No. 2011-118603).

However, there is a case where a traffic signal is installed in a section including a diverging section or a merging section in a toll road for the purpose of restricting the number of vehicles entering the toll road. In such a case, the conventional technique inevitably stops the automated drive in the vicinity of the traffic signal, since control of the automated drive based on the lighting state of the traffic signal is complicated.

SUMMARY

The present application describes a vehicle controller, a vehicle control method, and a vehicle control program capable of performing automated drive more actively.

According to a first aspect of the present disclosure, a vehicle controller (100) includes: an identification unit (104) (a traffic signal state detector) that identifies an operation state of a traffic signal existing on a route up to a destination; a setting unit (106) that sets an automated drive mode section on the route based on the operation state of the traffic signal identified by the identification unit, the automated drive mode section which means a section of the route where an automated drive mode of controlling acceleration, deceleration, or steering by the vehicle controller, i.e., a self-driving operation, is to be permitted by the vehicle controller as a section considered safely capable or available for that operation mode during travelling of a vehicle; and a travel control unit (112) that controls the travelling of the vehicle in the automated drive mode in the automated drive mode section set by the setting unit.

According to a second aspect of the present disclosure, which is based on the vehicle controller of the first aspect, in a case where the identification unit recognizes that a traffic signal existing on the route is not in operation at a time when the automated drive mode section is set, the setting unit sets the automated drive mode section irrespective of a position of the traffic signal not in operation.

According to a third aspect of the present disclosure, which is based on the vehicle controller of the second aspect, in a case where the identification unit recognizes that a traffic signal existing on the route is in operation after the automated drive mode section setting, the setting unit changes the already set automated drive mode section such that a section from the position of the vehicle to a position before the traffic signal in operation is an automated drive mode section and a section around the traffic signal in operation is a temporary manual drive mode section, or changes the route so as to avoid the traffic signal in operation.

According to a fourth aspect of the present disclosure, the vehicle controller according to any one of the first to third aspects of the present disclosure further includes a communication unit (65) that communicates with an external device (300), and the setting unit calculates a time when the vehicle will pass a traffic signal existing on the route and sets the automated drive mode section based on the calculated time and time information acquired by the communication unit from the external device and indicating a time when the traffic signal is to operate.

According to a fifth aspect of the present disclosure, the vehicle controller according to any one of the first to fourth aspects of the present disclosure further includes a communication unit that communicates with an external device, and the identification unit estimates the operation state of the traffic signal based on information acquired by the communication unit from the external device, and allowing a state of a vehicle existing within a predetermined distance before the traffic signal to be identified.

According to a sixth, aspect of the present disclosure, the vehicle controller according to any one of the first to fifth aspects of the present disclosure further includes a vehicle detection unit (20, 30, 40) that detects a preceding forward vehicle traveling in front of the host vehicle, and the identification unit identifies a state of the preceding vehicle including a stopped state or a deceleration state based on a detection result of the detection unit, and if identifying the stopped state or deceleration state of the preceding vehicle within a predetermined distance before a traffic signal existing on the route, estimates that the traffic signal at a starting point of the predetermined distance is in operation.

According to a seventh aspect of the present disclosure, the vehicle controller according to any one of the first to sixth aspects of the present disclosure further includes a capturing unit 40 that captures the surroundings of the vehicle, and the identification unit estimates the operation state of the traffic signal including the existence and a lighting state of the traffic signal, based on the image acquired from the capturing unit.

An eighth aspect of the present disclosure provides a vehicle control method including the steps, executed by a computer, of: identifying an operation state of a traffic signal existing on a route up to a destination; setting an automated drive mode section on the route based on the identified operation state of the traffic signal, the automated drive mode section being a section where an automated drive mode of controlling acceleration, deceleration, or steering is permitted during travelling of a vehicle; and controlling the traveling of the vehicle in the automated drive mode in the automated drive mode section.

A ninth aspect of the present disclosure provides a vehicle control program (which may be provided as a program product or medium storing the program therein and executable on the vehicle controller) causing a computer to identify an operation state of a traffic signal existing on a route up to a destination; set an automated drive mode section on the route based on the identified operation state of the traffic signal, the automated drive mode section being a section where an automated drive mode of controlling acceleration, deceleration, or steering is permitted during travelling of a vehicle; and control the traveling of the vehicle in the automated drive mode in the automated drive mode section.

According to the first to third aspects, and the eighth and ninth aspects of the present disclosure, the automated drive may be performed more actively by identifying the operation state of a traffic signal existing on a route up to a destination, setting an automated drive mode section, where an automated drive mode of controlling acceleration, deceleration, or steering is available during travelling of a vehicle, on the route based on the identified operation state of the traffic signal, and controlling the traveling of the vehicle in the automated drive mode in the automated drive mode section.

According to the fourth aspect of the present disclosure, the automated drive may be performed more easily depending on the operation state of the traffic signal by calculating a time when the vehicle will pass a traffic signal existing on the route and setting the automated drive mode section based on the calculated time and the time information indicating a time when the traffic signal is to operate.

According to the fifth aspect of the present disclosure, the automated drive may be performed more easily depending on the operation state of the traffic signal by estimating the operation state of the traffic signal based on the information allowing a state of a vehicle existing within a predetermined distance before the traffic signal to be identified.

According to the sixth aspect of the present disclosure, the automated drive may be performed more easily depending on the operation state of the traffic signal by identifying the state of the preceding vehicle including the stopped state or deceleration state based on the detection result of the detection unit, and f identifying the stopped state or deceleration state of the preceding vehicle within a predetermined distance before a traffic signal existing on the route, estimates that the traffic signal at a starting point of the predetermined distance is in operation.

According to the seventh aspect of the present disclosure, the automated drive may be performed more easily depending on the operation state of the traffic signal by estimating the operation state of the traffic signal including the existence and a lighting state of the traffic signal, based on the image acquired from the capturing unit. The word "unit" used in this application may mean a physical part or component of computer hardware or any device including a controller, a processor, a memory, etc., which is particularly configured to perform functions or steps as disclosed in the application.

DESCRIPTION OF THE PREFERRED EMBODIMENTS

Hereinafter, embodiments of a vehicle controller, a vehicle control method, and a vehicle control program of the present disclosure are described with reference to the accompanying drawings.

First Embodiment

Figure 1:
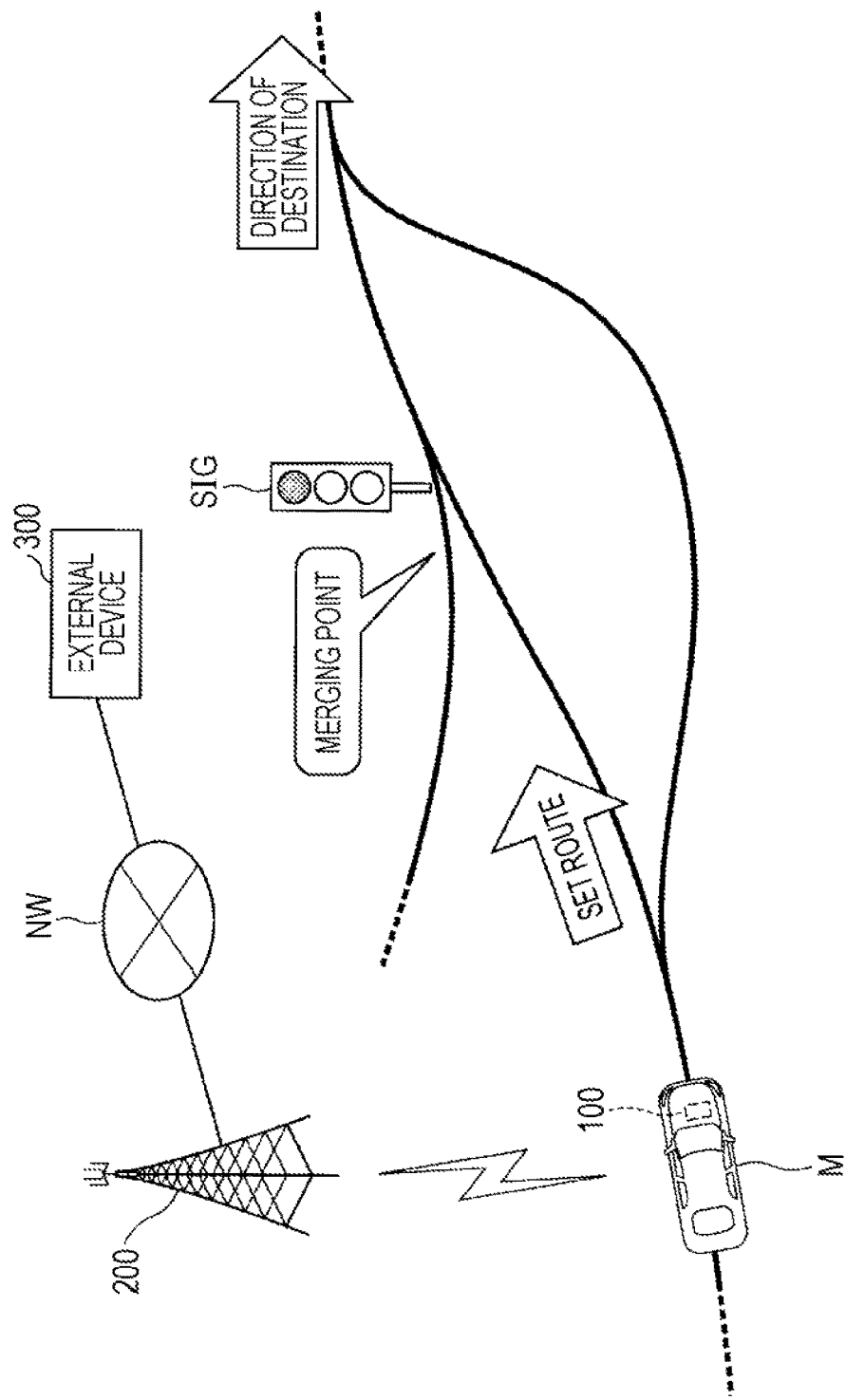
FIG. 1 schematically illustrates an operation of a vehicle (vehicle concerned) equipped with a vehicle controller according to a first embodiment.

FIG. 1 schematically illustrates operation of a vehicle M (vehicle concerned) equipped with a vehicle controller 100 according to the first embodiment. In the first embodiment, the vehicle controller enables the vehicle to travel in an automated drive mode in which the vehicle travels without being operated by a driver (or with less operation amount or less operation frequency of the driver as compared with a manual drive mode in which the vehicle is driven manually by the driver). The vehicle M is, for example, a two-wheeled, a three-wheeled or four-wheeled automobile, including an automobile using an internal combustion engine such as a diesel engine and a gasoline engine as a power source, an electric vehicle using an electric motor as a power source, and a hybrid automobile equipped with both the internal combustion engine and the electric motor as a power source. The electric vehicle includes an automobile driven by using a power discharged from a variety of cells including, for example, a secondary cell, a hydrogen fuel cell, a metal fuel cell, and an alcohol fuel cell.

The example of FIG. 1 represents that the vehicle controller 100 controls traveling of the vehicle M to perform automatic traveling on a toll road such as an expressway. The vehicle controller 100 generates an action plan referred to during execution of automated drive on a route, based on route information 134 indicating the route up to a destination, the route information 134 generated by a navigation device 50 described later. When generating the action plan, the vehicle controller 100 sets a section in which the vehicle M is automatically driven on the route depending on an operation state of a traffic signal SIG existing on the route up to the destination.

The traffic signal SIG according to the first embodiment is installed, for example, in a section including a diverging or merging section of a toll road in order to restrict the number of vehicles entering the toll road. The traffic signal SIG operates, for example, in accordance with the commute time in the early morning or in the evening. The traffic signal SIG is a time-zone-driven type traffic signal which is controlled, for example, so as not to turn on (is not in operation) in a less congested time zone and intermittently change from a red signal (passage prohibiting signal) to a blue signal (passage allowing signal) (in an operating state) in a congested time zone. Operation time (operation time zone) of the traffic signal SIG is stored in an external device 300 such as, for example, a server device. Therefore, the vehicle controller 100 acquires traffic signal operation information indicating operation time and the operation state of the traffic signal SIG from the external device 300 via a radio base station 200 and sets a section on the route where the vehicle M is automatically driven. For example, a radio communication using a mobile phone network is performed between the vehicle controller 100 and the radio base station 200, and a wired communication using a network NW such as a public line is performed between the radio base station 200 and the external device 300. The network NW is a line network such as, for example, a wide area network (WAN) and a local area network (LAN). The external device 300 may be a center server such as an Internavi server or may be an artificial satellite.

The action plan includes, for example, a deceleration event for causing the vehicle M to decelerate, an acceleration event for causing the vehicle M to accelerate, a lane keeping event for causing the vehicle M to travel so as not to deviate from the traveling lane, a lane changing event, for changing the traveling lane, an overtaking event for causing the vehicle M to overtake a preceding vehicle, a diverging event for causing the vehicle M to change to a desired lane at a diverging point and travel so as not to deviate from the changed lane, and a merging event for causing the vehicle M to accelerate and decelerate at a lane merging point to change the traveling lane.

Figure 2:
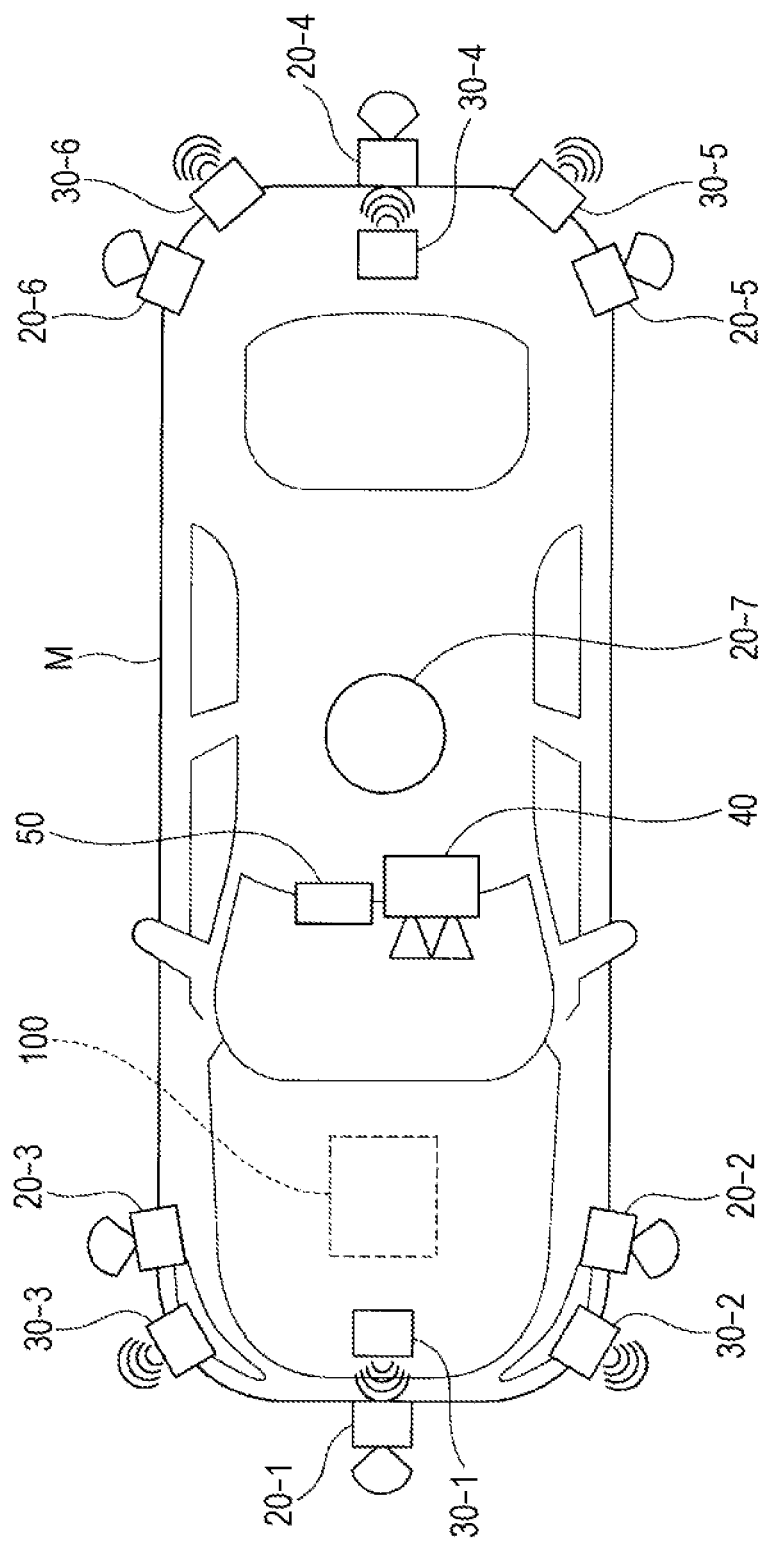
FIG. 2 illustrates examples of devices mounted on the vehicle.

FIG. 2 illustrates examples of devices mounted on the vehicle M. As illustrated in FIG. 2, the vehicle M according to the first embodiment is equipped with apparatuses such as finders 20-1 to 20-7, radars 30-1 to 30-6, and a camera 40, a navigation device 50, and the vehicle controller 100. Finders 20-1 to 20-7 are, for example, a light detection and ranging device or a laser imaging detection and ranging (LIDAR) device that measures scattering light relative to irradiation light and measure a distance up to an object. For example, the finder 20-1 is attached to a front grill, a front bumper, and so on, and the finders 20-2 and 20-3 are each attached to a lateral side of the vehicle with respect to the vehicle travel direction, a door mirror, the inside of a headlight, a place near a side light, and so on. The finder 20-4 is attached to a trunk lid, and so on, and the finders 20-5 and 20-6 are each attached to the lateral side of the vehicle with respect to the vehicle travel direction, the inside of a tail light, and so on. The finders 20-1 to 20-6 each have, for example, a detection range of about 150 degrees with respect to the horizontal direction. The finder 20-7 is attached to a bonnet, roof, and so on. The finder 20-7 has, for example, a detection range of 360 degrees with respect to the horizontal direction. The apparatuses mentioned above are an example of the "detection unit".

The radars 30-1 to 30-4 are, for example, a long distance millimeter wave radar having a wide detection range in the depth direction (distance direction). Radars 30-2, 30-3, 30-5, 30-6 are a middle distance millimeter wave radar having a detection range which is narrower than a detection range of radars 30-1 and 30-4 in the depth direction (distance direction) and wider than a detection range thereof in the azimuth direction (width direction) which is orthogonal to the depth direction (distance direction). Hereinafter, finders 20-1 to 20-7 are simply referred to as "finder 20" unless otherwise distinguished, and radars 30-1 to 30-6 are simply referred to as "radar 30" unless otherwise distinguished.

The camera 40 includes, for example, a monocular camera and a stereo camera. The camera 40 is provided, for example, on the top of the front wind shield or on the back surface of the room mirror within a boarding space of the vehicle M so as to capture the front side of the vehicle M. The camera 40 according to the first embodiment has no specific limitations to the wavelength of light received when capturing, and may be, for example, a multi-spectral camera. The camera 40 is an example of the "capturing unit".

The navigation device 50 includes, for example, a touch panel having a function of receiving a setting and input of the destination from the user and a function of displaying the route to the destination, a navigation satellite apparatus such as a global navigation satellite system (GNSS), an inertial navigation device such as an inertial navigation system (INS), and a storage device. The navigation device 50 utilizes a radio navigation method using the navigation satellite apparatus and a self-contained navigation method using the inertial navigation device in combination, and identifies the position of the vehicle M by comparing a navigation map (map information) pre-stored in the storage device and a route (road) where the vehicle M is traveling with each other. The navigation map is a map in which a road shape is represented by a node and a link to which information such as the number of lanes and curvature is added. The navigation device 50 derives a route up to a destination set by the user such as a driver and a passenger from the position of the identified vehicle M. Then, the navigation device 50 makes guidance of the route leading to the destination by voice and navigation display at least when the vehicle controller 100 executes the manual drive mode. Configuration for identifying the position of the vehicle M is provided independently from the navigation device 50. For example, the navigation satellite apparatus and inertial navigation device may be provided inside the vehicle controller 100.

The navigation device 50 outputs position information indicating the position of the identified vehicle M, map information used to set the destination, and route information indicating the route to the destination to the vehicle controller 100. The navigation device 50 may be implemented, for example, by a function of a terminal device such as a smartphone and tablet terminal owned by the user.

Figure 3:
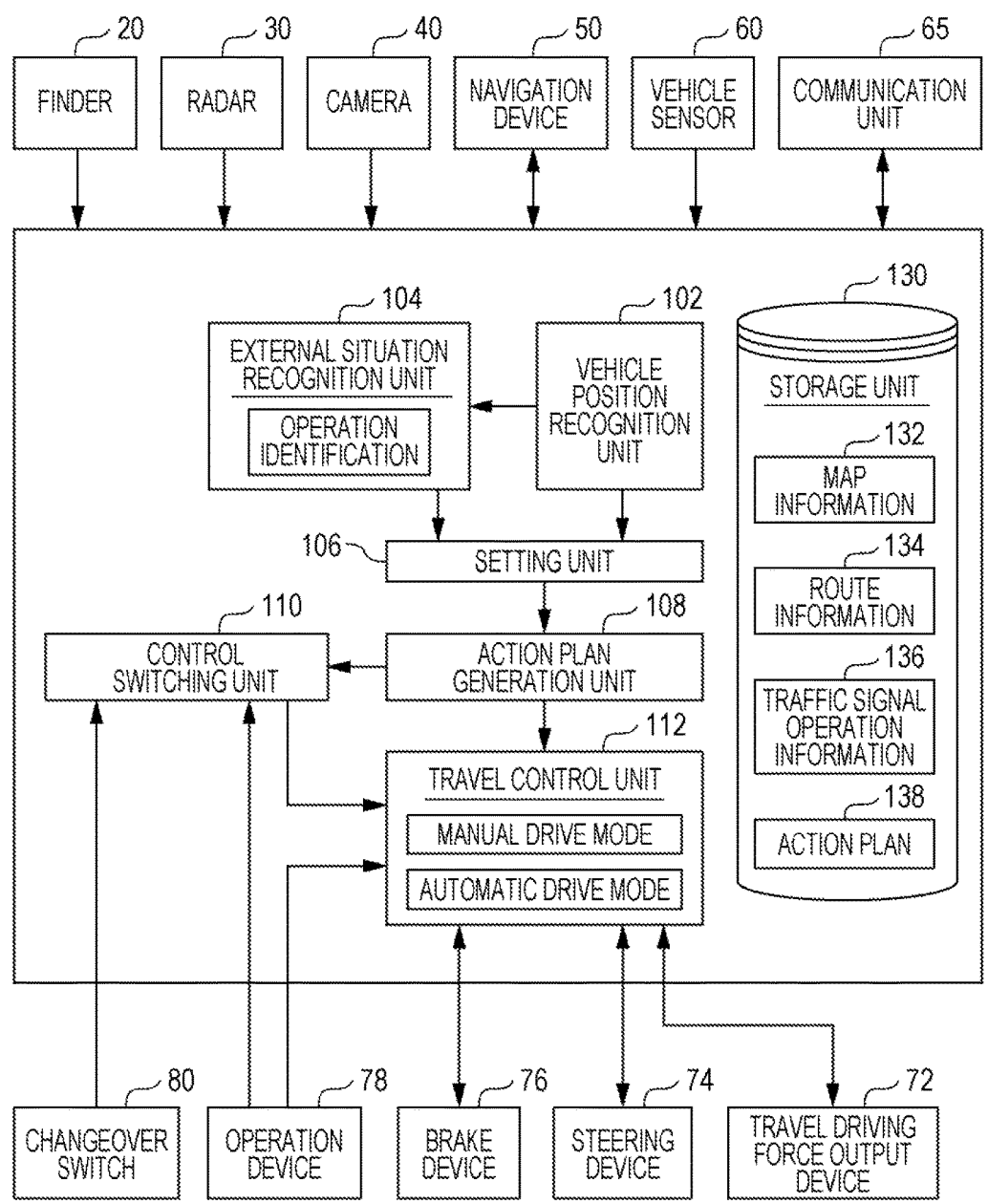
FIG. 3 illustrates an example of a functional configuration of the vehicle equipped with the vehicle controller according to the first embodiment.

FIG. 3 illustrates an example of a functional configuration of the vehicle M on which the vehicle controller 100 according to the first embodiment is mounted. The vehicle M is provided with a finder 20, a radar 30, a camera 40, a navigation device 50, a vehicle sensor 60, a communication unit 65, a travel driving force output device 72, a steering device 74, a brake device 76, an operation device 78, a changeover switch 80, and a vehicle controller 100. These devices and apparatuses are coupled with each other via a multiplex communication line such as a controller area network (CAN), serial communication line, a radio communication network, and so on.

The vehicle sensor 60 includes a vehicle speed sensor for detecting the vehicle speed, an acceleration sensor for detecting the acceleration speed, a yaw rate sensor for detecting the angular speed around a vertical axis, an azimuth sensor for detecting the direction of the vehicle M, and so on.

The communication unit 65 communicates with the external device 300, for example, by converting information inputted from the vehicle controller 100 to the radio wave and outputting the radio wave to the radio base station 200, and receiving the radio wave outputted by the radio base station 200. Thus, the communication unit 65 acquires traffic signal operation information from the external device 300. The communication unit 65 outputs the acquired traffic signal operation information to the vehicle controller 100. In the first embodiment, a traffic signal SIG on the route may output the traffic signal operation information or information corresponding to the traffic signal operation information. For example, when a vehicle enters within a predetermined range with the traffic signal SIG as a center, the traffic signal SIG transmits traffic signal operation information indicating the operation state of the traffic signal to the vehicle by radio communication. The communication unit 65 may acquire traffic signal operation information (or information corresponding thereto) by communicating with the traffic signal SIG. The communication unit 65 is an example of the "communication unit".

The communication unit 65 may acquire, for example, position information of multiple vehicles located on a route where the concerned vehicle is traveling and speed information of the multiple vehicles from the external device 300. The communication unit 65 may acquire position information and speed information of the vehicle from a device different from the external device 300. Position information and speed information of other vehicles is an example of the "identifiable information".

The travel driving force output device 72 is provided, for example, with an engine and an engine electronic control unit (ECU) controlling the engine if the vehicle M is an automobile using the internal combustion engine as a power source, a traveling motor and a motor ECU controlling the traveling motor if the vehicle M is an electric car using the electric motor as a power source, and an engine and an engine ECU and a traveling motor and a motor ECU if the vehicle M is a hybrid automobile. In a case where the travel driving force output device 72 includes the engine only, the engine ECU regulates the throttle opening and shift stage of the engine in accordance with information inputted from a travel control unit 112 described later and outputs the travel driving force (torque) for traveling of the vehicle. In a case where the travel driving force output device 72 includes a traveling motor only, the motor ECU regulates the duty ratio of the PWM signal given to the traveling motor in accordance with information inputted from the travel control unit 112, and outputs the travel driving force. In a case where the travel driving force output device 72 includes an engine and a traveling motor, both the engine ECU and motor ECU control the travel driving force in cooperation with each other in accordance with information inputted from the travel control unit 112.

The steering device 74 includes, for example, an electric motor, a steering torque sensor, a steering angle sensor, and so on. The electric motor changes the orientation of the steering wheel, for example, by applying a force to a rack and pinion feature, and so on. The steering torque sensor detects, for example, torsion of the torsion bar as a steering torque (steering force) when the steering wheel is operated. The steering angle sensor detects, for example, a steering angle (or actual steering angle). The steering device 14 causes the electric motor to drive in accordance with information inputted from the travel control unit 112 and changes the orientation of the steering wheel.

The brake device 76 includes a master cylinder to which brake operation by a brake pedal is transmitted as hydraulic pressure, a reservoir tank for reserving a brake fluid, a brake actuator for regulating a braking force outputted to each of wheels, and so on. The brake device 76 controls the brake actuator and so on in accordance with information inputted from the travel control unit 112 such that a brake torque corresponding to a pressure of the master cylinder is outputted to each of wheels. The brake device 76 is not limited to the above electronically controlled brake device operated by hydraulic pressure, but may be an electronically controlled brake device operated by an electric actuator.

The operation device 78 includes, for example, an accelerator pedal and a brake pedal, a steering wheel, a shift lever, and operation detection sensors attached thereto. The operation device 78 generates an operation detection signal corresponding to user's operation and outputs the generated signal to a control switching unit 110 or travel control unit 112.

The changeover switch 80 is a switch operated by a driver, and so on. The changeover switch 80 may be, for example, a mechanical switch provided on the steering wheel and garnish (dashboard) or may be a graphical user interface (GUI) switch provided on a touch panel of the navigation device 50. The changeover switch 80 receives operation of the driver and so on, generates a control mode designating signal which designates the control mode by the travel control unit 112 to either the automated drive mode or manual drive mode, and outputs the generated signal to the control switching unit 110. The automated drive mode is a drive mode in which the vehicle travels without driver's operation (or with less operation amount or low operation frequency as compared with the manual drive mode) as described above. More particularly, the automated drive mode is a drive mode which controls part or whole of the travel driving force output device 72, steering device 74, and brake device 76 based on the action plan 138.

Hereinafter, the vehicle controller 100 is described. The vehicle controller 100 includes, for example, an external situation recognition unit 104, a vehicle position recognition unit 102, a setting unit 106, an action plan generation unit 108, a control switching unit 110, a travel control unit 112, and a storage unit 130. These function units are coupled with each other via an internal bus. The storage unit 130 is implemented, for example, by a nonvolatile storage medium such as a read only memory (ROM), a flash memory and a hard disk drive (HDD), and a volatile storage medium such as a random access memory (RAM) and a register. Information stored in the storage unit 130 includes programs executed by a processor, and information such as information indicating map information 132, route information 134, traffic signal operation information 136, and the action plan 138 described later.

The vehicle position recognition unit 102 recognizes the lane (traveling lane) on which the vehicle M travels, and a relative position of the vehicle M to the traveling lane, based on the map information 132 stored in the storage unit 130 and information inputted from the finder 20, radar 30, camera 40, navigation device 50 or vehicle sensor 60. The map information 132 is, for example, map information which is more precious than a navigation map of the navigation device 50, and includes information such as the position of the traffic signal SIG, lane center information or lane boundary information. More specifically, the map information 132 includes road information, traffic regulation information, address information (address, postal code), facility information, telephone number information, and so on. The road information includes such information as information representing the road type such as the expressway, toll road, national road, and public road, and information such as the number of lanes on the road, position of the traffic signal SIG on each of lanes, width of each lane, inclination of the road, position of the road (three-dimensional coordinates including longitude, latitude and height), curvature of curves on the lane, position of the merging and diverging points in the lane, and sign provided on the road. The traffic regulation information includes such information indicating a lane is blocked due to a construction work, traffic accident or congestion.

Figure 4:
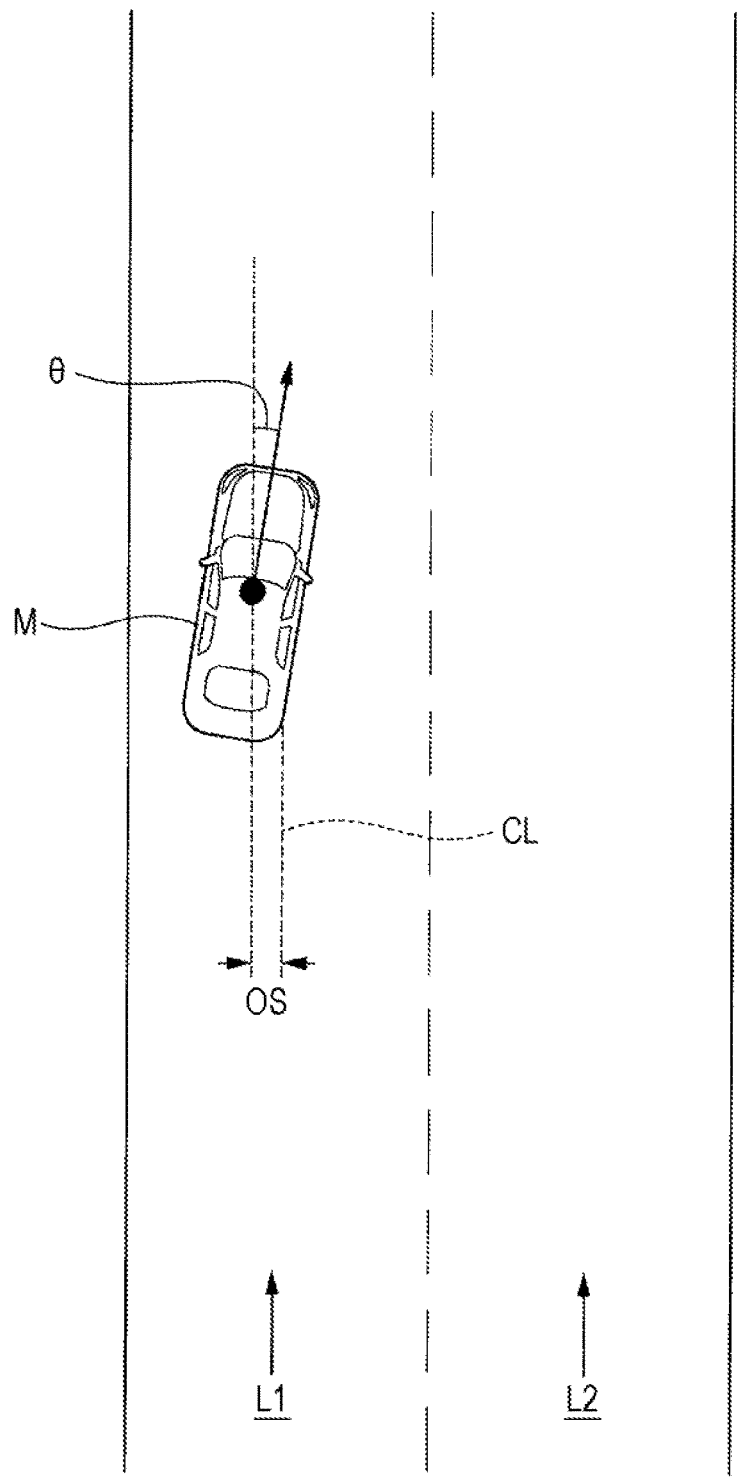
FIG. 4 illustrates how a vehicle position recognition unit recognizes a relative position of the vehicle to a traveling lane L1.

FIG. 4 illustrates how a relative position of the vehicle M to a traveling lane L1 is recognized by a vehicle position recognition unit 102. The vehicle position recognition unit 102 recognizes, for example, an offset OS of the reference point (for example, the barycenter) of the vehicle M from a traveling lane center CL and an angle θ of the vehicle M to a line extending along the traveling lane center CL in the travel direction, as the relative position of the vehicle M to the traveling lane L1. When the traffic regulation information is included in the map information 132, the external situation recognition unit 104 may correct recognition result based on the traffic regulation information. For example, when the recognition result indicates that the vehicle is traveling on a blocked lane, the vehicle position recognition unit 102 corrects the result to indicate that the vehicle M is traveling on a lane adjacent to a blocked lane.

The external situation recognition unit 104 identifies detection results of respective apparatuses and recognizes the state of position and speed of objects such as nearby vehicles based on the identified detection results. For example, the external situation recognition unit 104 integrates detection results of the finder 20, radar 30 and camera 40 and thereby recognizes the state of position and speed of the objects (sensor fusion). Further, the external situation recognition unit 104 estimates the behavior of the objects based on the state thereof such as position and speed.

The external situation recognition unit 104 may estimate the operation state of the traffic signal SIG based on the recognition result of a nearby vehicle. Specifically, when the vehicle M is within a predetermined distance (for example, about 500 meters) from a traffic signal SIG existing on a route up to the destination, the external situation recognition unit 104 estimates the operation state of the traffic signal SIG at a starting point of the predetermined distance when the state of a preceding vehicle is identified. For example, when the speed of the preceding vehicle is less than or equal to a threshold value while the vehicle M is traveling within a predetermined distance from a traffic signal M, the external situation recognition unit 104 recognizes that the preceding vehicle is in the stopped or deceleration state and estimates that the traffic signal SIG at a starting point of the predetermined distance is operating and may request the vehicle to stop. The external situation recognition unit. 104 may estimate that the preceding vehicle is in the stopped or deceleration state when the relative speed of the preceding vehicle to the speed of the vehicle concerned is less than or equal to the threshold value, and may estimate that the preceding vehicle is in the stopped or deceleration state when the relative speed of the preceding vehicle to a speed specified for a traveling route is less than or equal to the threshold value.

Figure 5:
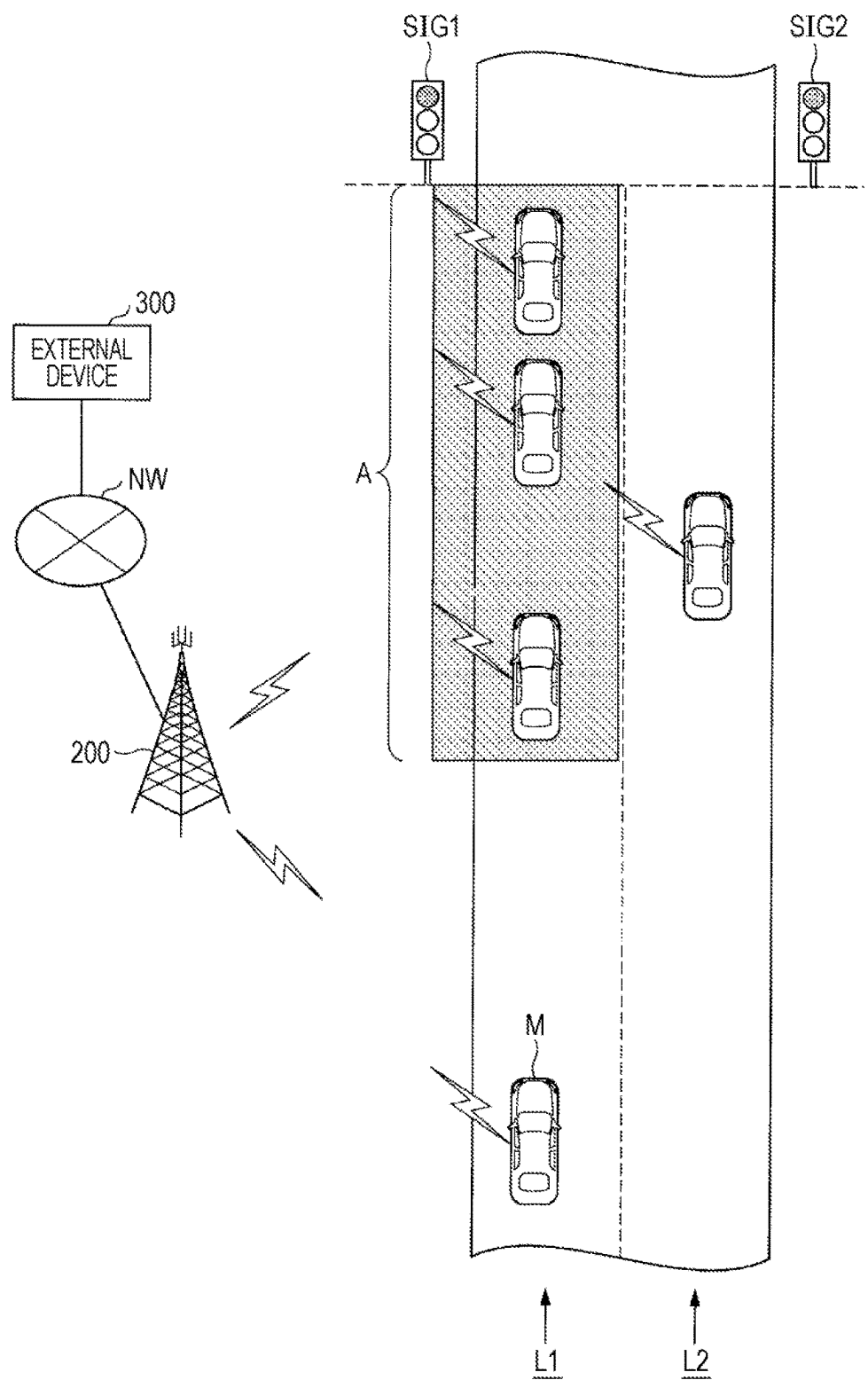
FIG. 5 illustrates an example of a method of estimating an operation state of a traffic signal.

The external situation recognition unit 104 may estimate the operation state of the traffic signal SIG based on position information of multiple vehicles located on the route where the vehicle concerned travels, speed information for each of the multiple vehicles, and the positions of traffic signals SIG included in the map information 132. FIG. 5 illustrates an example of a method of estimating the operation state of the traffic signal SIG. In the example of FIG. 5, a traffic signal SIG1 provided on the left side of a lane L1 operates and may request the vehicle to stop. In such a case, a vehicle traveling on a route on the side of the travel direction of the vehicle M traveling in the lane L1 keeps the stopped or deceleration state and transmits position information and speed information thereof to the external device 300. The vehicle controller 100 acquires position information and speed information of other vehicles from the external device 300 which thus stores information of the other vehicles. The external situation recognition unit 104 estimates the number of vehicles existing within a predetermined distance A before the position of the traffic signal SIG and an average speed of vehicles existing within the predetermined distance A based on the acquired position information and speed information of other vehicles, and identifies the operation state of the traffic signal SIG based on the estimation result. In the example of FIG. 5, the external situation recognition unit 104 estimates that the traffic signal SIG1 operates and may request the vehicle to stop when the number of vehicles existing within the predetermined distance A is greater than or equal to a threshold value (for example, three units), and estimates that the traffic signal SIG1 operates and may request the vehicle to stop when an average speed of vehicles existing within the predetermined distance A is less than or equal to a threshold value.

Figure 6:
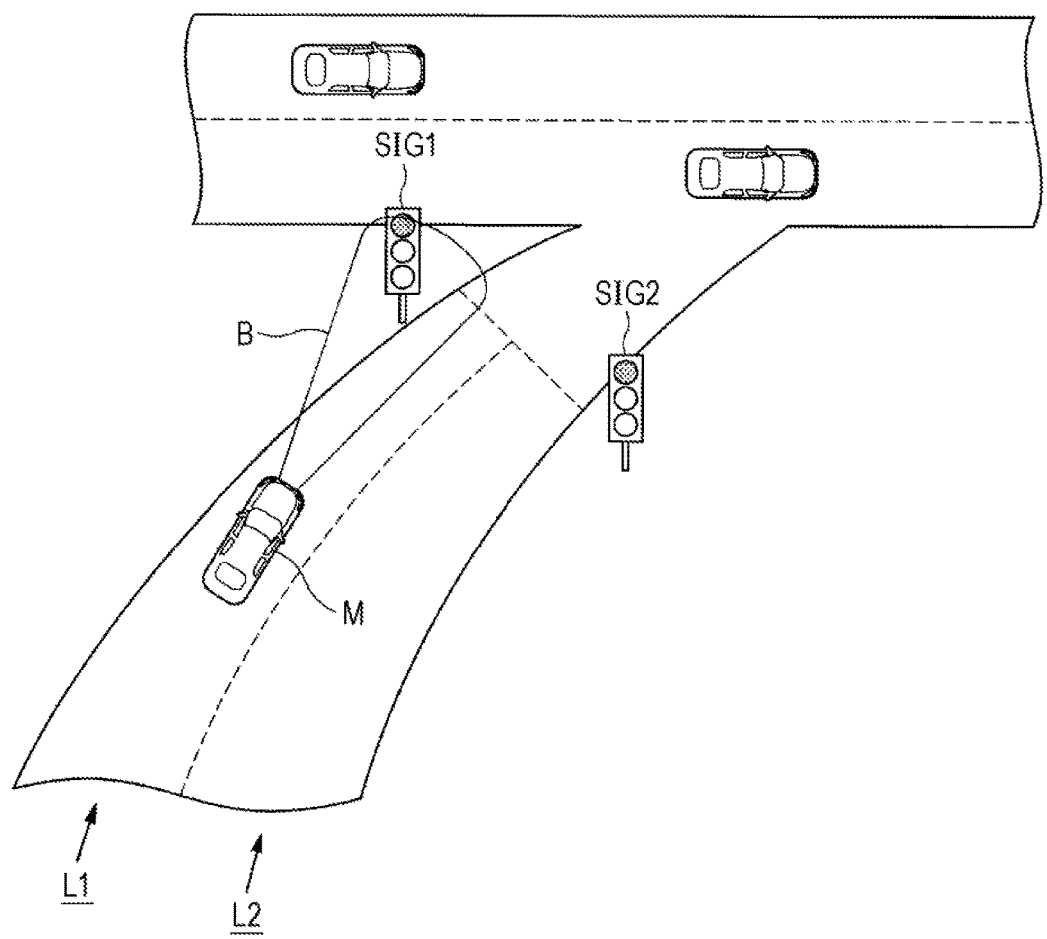
FIG. 6 illustrates another example of the method of estimating an operation state of a traffic signal.

Alternatively, the external situation recognition unit 104 may estimate the operation state of the traffic signal SIG based on the detection result of an apparatus such as the camera 40. FIG. 6 illustrates another example of the method of estimating the operation state of the traffic signal SIG. The example of FIG. 6 represents a traffic signal SIG included within a detection range B (field angle) of the camera 40. In such a case, the external situation recognition unit 104 estimates existence of the traffic signal SIG and lighting state of the traffic signal SIG by analyzing image data of the camera 40. For example, when state representing prohibition of vehicle's passage is indicated by a lighting of a red light and state representing permission of vehicle's passage is indicated by a lighting of a blue light, the external situation recognition unit 104 identifies, for example, the color of the lighting traffic signal SIG from image data using a color histogram. Thus, the external situation recognition unit 104 estimates lighting state of the traffic signal SIG. The identification processing of the operation state of the traffic signal SIG by the external situation recognition unit 104 corresponds to the feature of the "identification unit".

The setting unit 106 sets a manual drive mode section in which the manual drive mode is executed and an automated drive mode section in which either the manual drive mode or the automated drive mode may be executed, in a section of the route leading to the destination based on an operation state of the traffic signal SIG indicated by traffic signal operation information acquired from the external device 300 or an operation state of the traffic signal SIG estimated by the external situation recognition unit 104. In the first embodiment, the automated drive mode section is a section in which the automated drive mode is executed unless otherwise operated by the user such as a driver.

Figure 7:
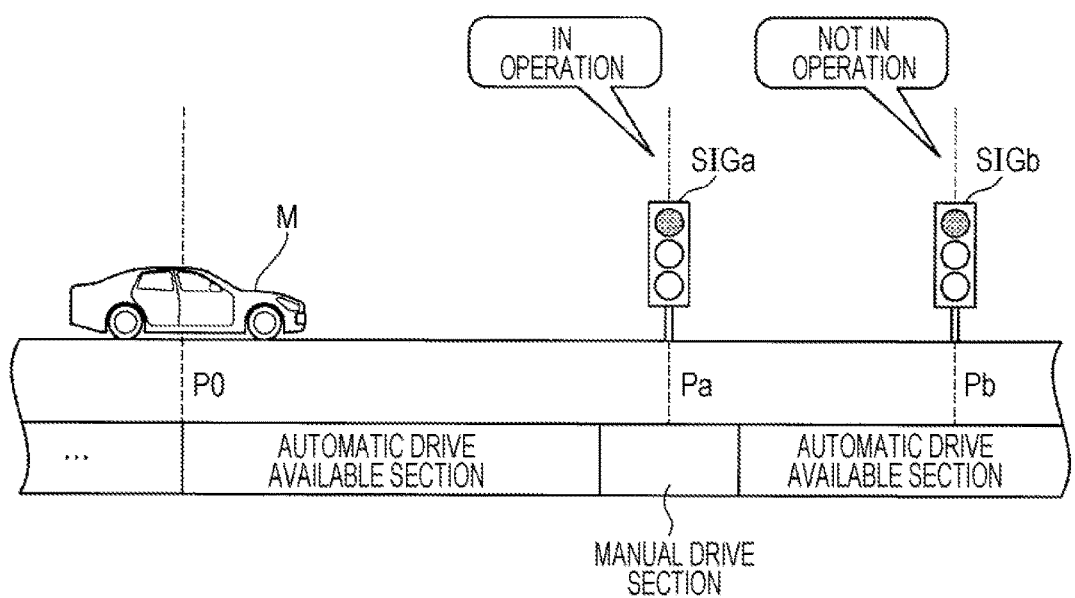
FIG. 7 is a diagram for illustrating an example of a method of setting a drive section.

FIG. 7 is a diagram for illustrating an example of a method of setting the drive section. In the example of FIG. 7, a traffic signal SIGa and a traffic signal SIGb exist in a route from the present position P0 of the vehicle M to the destination. The external situation recognition unit 104 recognizes, for example, that the traffic signal SIGa is in operation and the traffic signal SIGb is not in operation. In such a case, the setting unit 106 resets the destination to the position Pa of the traffic signal SIGa in operation and determines the route to finish at a position before the position Pa of the traffic signal SIGa. More specifically, the setting unit 106 sets a finishing position Pfin of the automated drive mode section to a position where automated drive ends before the vehicle M reaches the position of the traffic signal SIG.

Figure 8:
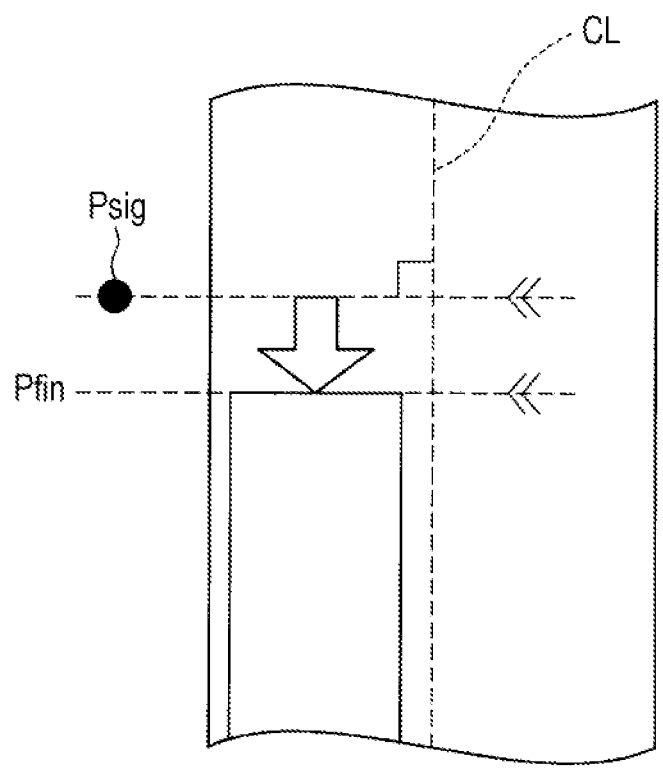
FIG. 8 is a diagram for illustrating a method of setting a finishing position of an automated drive mode section.

FIG. 8 is a diagram for illustrating a method of setting the finishing position Pfin of the automated drive mode section. As illustrated in FIG. 8, the setting unit 106 sets the finishing position Pfin of the automated drive mode section to the side of the position P0 of the vehicle M with a perpendicular line as a reference, the perpendicular line, for example, extending from the position Psig of the traffic signal SIG approximately vertically down to the traveling lane center line CL in a road.

The setting unit 106 temporarily sets a section around the traffic signal SIGa in operation as a manual drive mode section. Specifically, the setting unit 106 sets the manual drive mode section such that manual drive is performed for a predetermined time (or predetermined distance) from the finishing position Pfin of the set automated drive mode section, and sets a section following the set manual drive mode section as the automated drive mode section.

Figure 9:
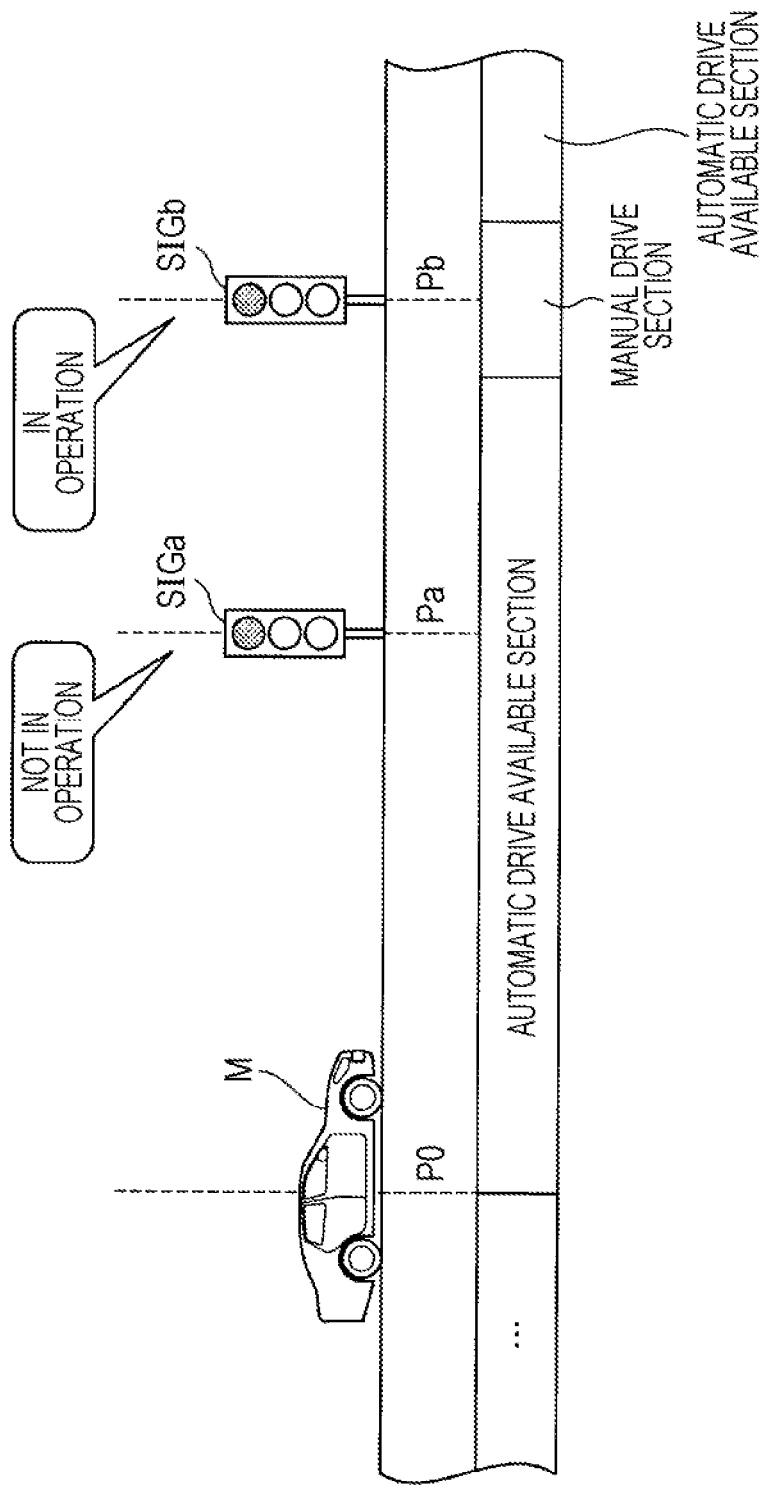
FIG. 9 is a diagram for illustrating another example of the method of setting the drive section.

FIG. 9 is a diagram for illustrating a further other example of the method of setting the drive section. In the example of FIG. 9, as similar to the example of FIG. 7, a traffic signal SIGa and a traffic signal SIGb exist in a route extending from the present position P0 of the vehicle M up to the destination. For example, the external situation recognition unit 104 recognizes that the traffic signal SIGa is not in operation and the traffic signal SIGb is in operation. In such a case, the setting unit 106 resets the position Pb of the traffic signal SIGb as the destination with the route extending up to the position Pb of the traffic signal SIGb. Specifically, the setting unit 106 sets a section from the position P0 of the vehicle M to a position before the position Pb of the traffic signal SIGb, or more specifically, a position in which automated drive ends before the vehicle M reaches the position of the traffic signal SIGb as the automated drive mode section, and temporarily sets the section around the traffic signal SIGb in operation as the manual drive mode section.

The setting unit 106 calculates a time when the vehicle will pass a traffic signal SIG existing on a route up to the destination, and sets the automated drive mode section based on the calculated time and an operation time included in the traffic signal operation information acquired from the external device 300. Specifically, the setting unit 106 calculates the time when the vehicle will pass the traffic signal SIG, based on the distance from the present position of the vehicle M to the position of the traffic signal SIG existing on the route up to the destination, and the present speed of the vehicle M. When the traffic signal SIG is not in operation at the calculated time with reference to the operation time of the traffic signal SIG, the setting unit 106 sets a section from the present position of the vehicle M to a position before the position of the traffic signal SIG as the automated drive mode section. Meanwhile, when the traffic signal SIG is in operation at a calculated time, the setting unit 106 sets a section around the traffic signal in operation SIG as a manual drive mode section.

In a case where a traffic signal SIG in operation exists on a route leading to the destination, the setting unit 106 may change the route itself. For example, the setting unit 106 changes the route to a bypass route in which the traffic signal SIG in operation does not exist, and automated drive can be performed up to the destination.

The action plan generation unit 108 generates an action plan 138 including multiple events based on a state of the vehicle M recognized by the vehicle position recognition unit 102, an external situation recognized by the external situation recognition unit 104, and a drive section set by the setting unit 106. Specifically, the action plan generation unit 108 sets various events in a drive section set as an automated drive mode section by the setting unit 106.

Figure 10:
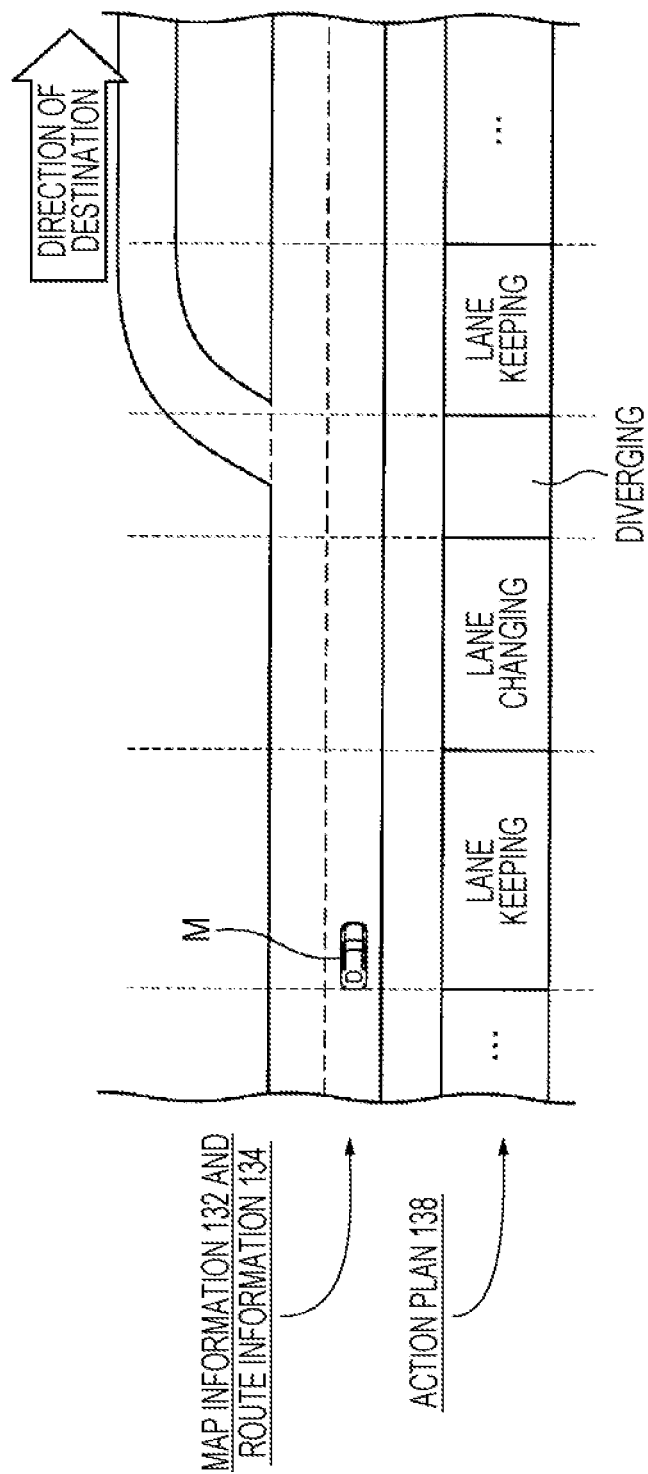
FIG. 10 is a diagram for illustrating an example of an action plan generated by an action plan generation unit.

FIG. 10 is a diagram for illustrating an example of the action plan 138 generated by the action plan generation unit 108. As illustrated in FIG. 10, for example, when a junction (diverging point) exists on the route up to the destination, the vehicle controller 100 needs to change or keep the lane such that the vehicle M travels in the direction of the destination in the automated drive mode. Therefore, when determined with reference to the map information 132 that a junction exists on the route, the action plan generation unit 108 sets a lane change event in a drive section set as an automated drive mode section from a present position (coordinate) of the vehicle M to a position (coordinate) of the junction. In the lane change event, the vehicle M will change the lane to a desired lane enabling the vehicle to travel in the direction of the destination.

In a case where entire drive section in the route up to the destination is set as the automated drive mode section, the action plan generation unit 108 may generate the action plan 138 so as to cause the vehicle M to always travel in the automated drive mode. For example, in a case where a road on which the vehicle M travels is a toll road such as an expressway, the action plan generation unit 108 may set an event in a drive section from the present position of the vehicle M to the entrance tollgate of toll road or in a drive section from the exit tollgate of toll road to the destination. For example, the action plan generation unit 108 sets a deceleration event and a lane keeping event at a point where the vehicle M travels within a fixed range of the entrance to tollgate and sets an acceleration event and a lane keeping event at a point where the vehicle M leaves the entrance tollgate. For example, the action plan generation unit 108 may set the deceleration event when the vehicle M travels to a lane merging point, and sets the acceleration event after the vehicle M merges.

The action plan generation unit 108 changes (updates) the action plan generated during traveling of the vehicle M based on an external situation recognized by the external situation recognition unit 104. In general, the external situation continuously varies while the vehicle is traveling. In particular, when the vehicle M travels on a road including multiple lanes, a relative distance to another vehicle varies. For example, in a case where a preceding vehicle decelerates by applying a sudden braking or where a vehicle traveling in a next lane cuts into the front of the vehicle M, the vehicle M needs to travel while changing the speed or lane in an appropriate manner according to the behavior of the preceding vehicle or the behavior of the vehicle traveling in the next lane. Therefore, the action plan generation unit 108 updates an event set for each of drive sections according to the changes of the external situation.

Specifically, when the speed of another vehicle recognized by the external situation recognition unit 104 exceeds a threshold value during traveling of the vehicle or when another vehicle traveling in a lane next to the current lane of the vehicle M changes the moving direction toward the current lane, the action plan generation unit 108 changes an event set for the drive section where the vehicle M is expected to travel. For example, let us consider the case where the lane keeping event and the lane changing event are set to be executed in this order. In this case, during the lane keeping event, if it is found from the recognition result of the external situation recognition unit 104 that a vehicle is approaching from behind in the lane of the lane change destination, the action plan generation unit 108 changes the event next to the lane keeping event from the lane changing event to the deceleration event, lane keeping event, or the like. Thus, the vehicle controller 100 can prevent the vehicle M from colliding with the vehicle in the lane of the lane change destination. As a result, the vehicle controller 100 enables the vehicle M to make automatic traveling in a safe manner even if a change in the external situation occurs.

The control switching unit 110 switches the control mode of the vehicle M by the travel control unit 112 from the automated drive mode to the manual drive mode or from the manual drive mode to the automated drive mode based on the action plan 138 generated by the action plan generation unit 108. Specifically, when the vehicle M travels in a section set as the manual drive mode section, the control switching unit 110 switches the control made of the vehicle M by the travel control unit 112 from the automated drive mode to the manual drive mode or maintains the manual drive mode. When the vehicle M travels in a section set as the automated drive mode section, the control switching unit 110 switches the control mode of the vehicle M by the travel control unit 112 from the manual drive mode to the automated drive mode or maintains the automated drive mode.

The control switching unit 110 switches the control mode of the vehicle M by the travel control unit 112 from the automated drive mode to the manual drive mode or from the manual drive mode to the automated drive mode based on the control mode designating signal inputted from the changeover switch 80. That is, the control mode of the travel control unit 112 can be changed by operation of a driver as desired while traveling or stopping.

The control switching unit 110 switches the control mode of the vehicle M by the travel control unit 112 from the automated drive mode to the manual drive mode based on the operation detection signal inputted from the operation device 78. For example, when the operation amount included in the operation detection signal exceeds a threshold value or when the operation device 78 is operated with the operation amount exceeding the threshold value by a driver, the control switching unit 110 switches the control mode of the travel control unit 112 from the automated drive mode to the manual drive mode. For example, when the vehicle M is performing automatic traveling by the travel control unit 112 set to the automated drive mode, and the steering wheel, accelerator pedal or brake pedal is operated by a driver with an operation amount exceeding a threshold value, the control switching unit 110 switches the control mode of the travel control unit 112 from the automated drive mode to the manual drive mode. In response, the travel control unit 112 outputs the operation detection signal received from the operation device 78 to the travel driving force output device 72, steering device 74 and/or brake device 76. Thus, the vehicle controller 100 can immediately change to the manual drive mode without operation of the changeover switch 80, by driver's instant operation when an object such as a person runs out onto a road or when a preceding vehicle stops suddenly. As a result, the vehicle controller 100 is capable of addressing emergency operation by the driver and thereby enhancing the safety in traveling.

The travel control unit 112 sets the control mode to the automated drive mode or manual drive mode by control of the control switching unit 110 and controls the control target in accordance with the set control mode. In the automated drive mode, the travel control unit 112 reads the action plan 138 generated by the action plan generation unit 108 and controls the control target based on an event included in the read action plan 138. For example, in a case where an event included in the action plan 138 is the lane changing event, the travel control unit 112 determines a control amount (for example, rotation frequency) of an electric motor in the steering device 74 and a control amount (for example, throttle opening and shift stage of the engine) of the ECU in the travel driving force output device 72 with reference to the lane width included in the map information 132. The travel control unit 112 outputs information indicating a control amount determined for each of events to a corresponding control target. In the above example, the travel control unit 112 outputs information indicating a control amount of the electric motor to the steering device 74, and information indicating a control amount of the ECU to the travel driving force output device 72. Thus, each device under control can control itself in accordance with information indicating a control amount output inputted from the travel control unit 112. The travel control unit 112 adjusts a determined control amount in an appropriate manner according to the detection result of the vehicle sensor 60.

In the manual drive mode, the travel control unit 112 controls a control target based on the operation detection signal outputted from the operation device 78. For example, when an operation detection signal indicating the operation amount of the brake pedal is outputted from the operation device 78, the travel control unit 112 outputs the operation detection signal outputted from the operation device 78 to the brake device 76 as is. The travel control unit 112 also outputs in the same manner when an operation detection signal indicating the operation amount of the accelerator pedal, steering wheel, and shift lever is outputted from the operation device 78. Thus, each device under control can control itself in accordance with an operation detection signal outputted from the operation device 78 via the travel control unit 112. As a result, the vehicle controller 100 can control the vehicle M in a quick response to the operation by the user such as a driver.

Even in the automated drive mode, when the operation device 78 is operated with an operation amount greater than or equal to a threshold value, the travel control unit 112 stops reading the event included in the action plan 138 and outputs an operation detection signal outputted from the operation device 78 to a control target preferentially.

Although the operation state is identified (estimated) by various methods as described above, some of the methods may be omitted. For example, control may be performed by acquiring the time zone only without acquiring the state of the vehicle before the traffic signal.

Figure 11:
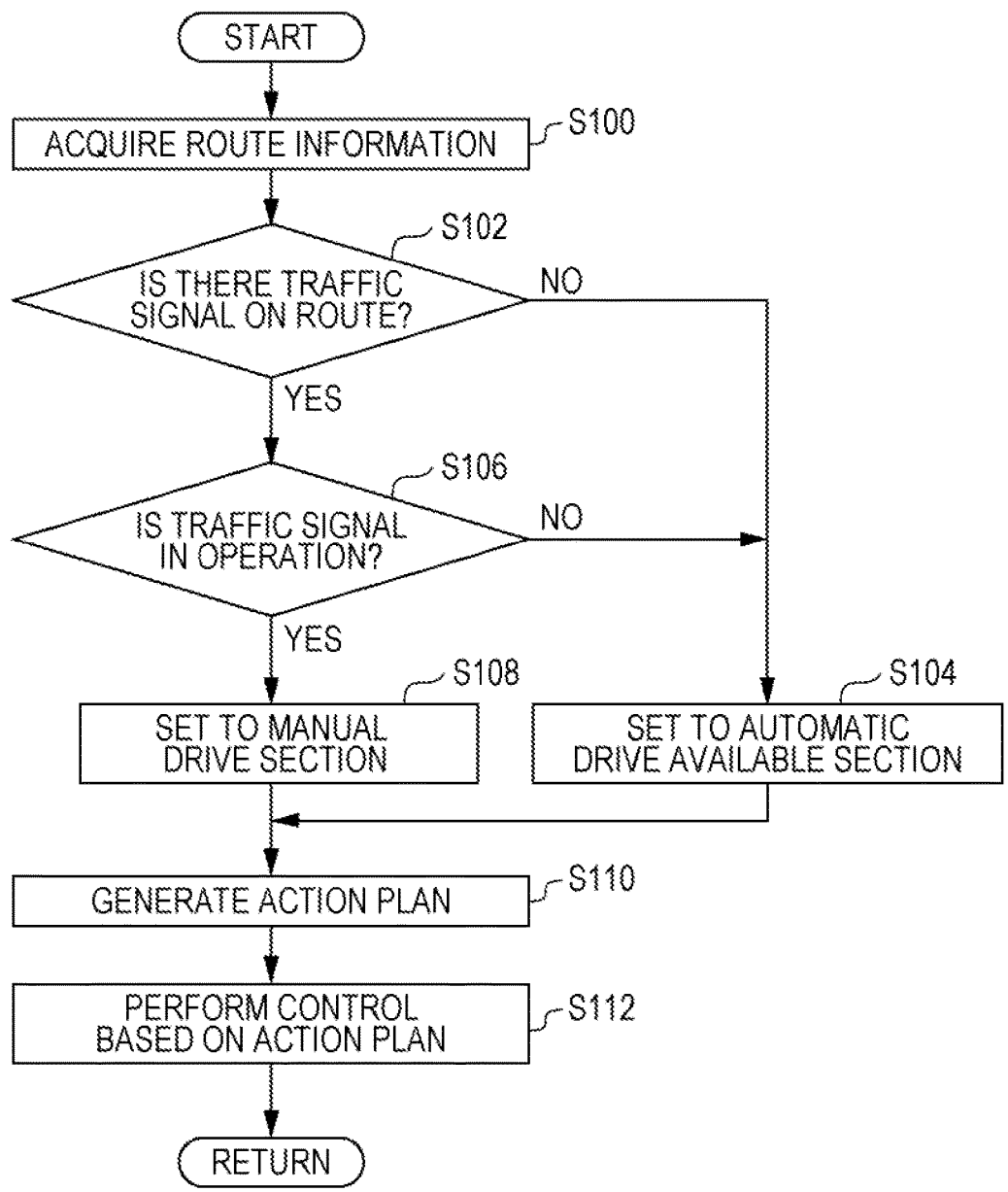
FIG. 11 is a flow chart illustrating an example of a process flow of the vehicle controller according to the first embodiment.

FIG. 11 is a flow chart illustrating an example of a process flow of the vehicle controller 100 according to the first embodiment. Processing illustrated in the flowchart is performed, for example, at a timing when the navigation device 50 receives setting input of the destination. In the processing illustrated in the flowchart, when the changeover switch 80 or operation device 78 is operated by the user such as a driver in the automated drive mode, the control switching unit 110 interrupts and performs switching of the control mode of the travel control unit. 112 from the automated drive mode to the manual drive mode.

First, the vehicle controller 100 acquires the map information 132 and route information 134 from the navigation device 50 (step S100). The vehicle controller 100 may acquire the map information 132 before performing the processing illustrated in the flowchart.

Next, the external situation recognition unit 104 compares a route indicated by the route information 134 with the map information 132 and determines whether a traffic signal SIG exists on the route (step S102). When the traffic signal SIG does not exist on the route, the setting unit 106 sets a route on the automated drive mode section (step S104). Meanwhile, when the traffic signal SIG exists on the route, the external situation recognition unit 104 determines whether the traffic signal SIG is in operation (step S106). Specifically, the external situation recognition unit 104 determines based on the traffic signal operation information 136 acquired from the external device 300 whether the traffic signal SIG is in operation. The external situation recognition unit 104 may determine (estimate) the operation state of the traffic signal SIG by identifying the state of a preceding vehicle. Alternatively, the external situation recognition unit 104 may determine (estimate) the operation state of the traffic signal SIG based on the detection result of an apparatus such as the camera 40.

When the traffic signal SIG on the route is not in operation, the setting unit 106 sets a route on the automated drive mode section (step S104). Meanwhile, when the traffic signal SIG on the route is in operation, the setting unit 106 sets a route around the traffic signal SIG in operation as a manual drive mode section (step S108).

Next, the action plan generation unit 108 generates an action plan 138 including multiple events based on a state of the vehicle M recognized by the vehicle position recognition unit 102, an external situation recognized by the external situation recognition unit 104, and a drive section set by the setting unit 106 (step S110). Next, when the drive section is the automated drive mode section or when the control mode is the automated drive mode, the travel control unit 112 controls the control target based on an action plan 138 generated by the action plan 138 (step S112). Thus, the processing illustrated in the flowchart ends.

Figure 12:
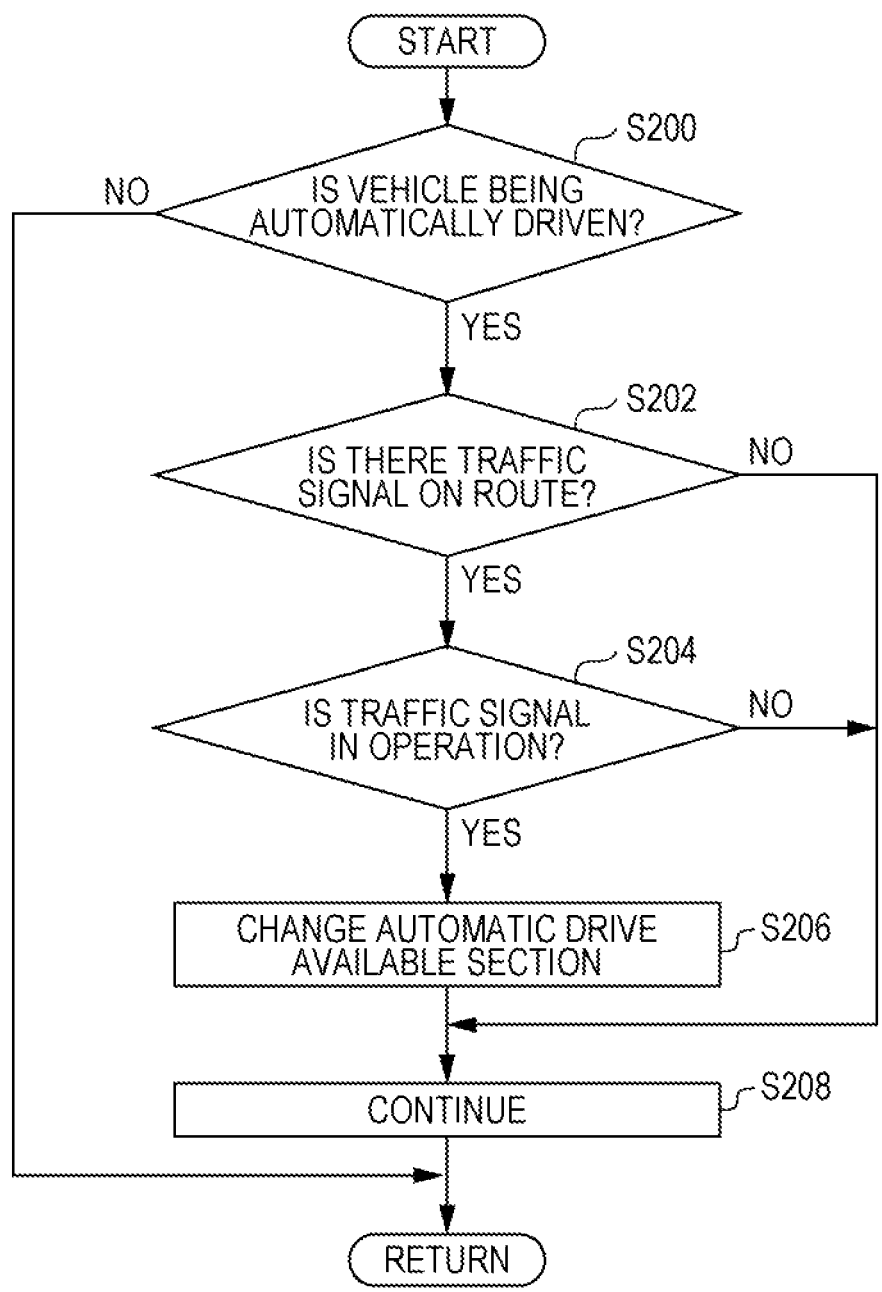
FIG. 12 is a flow chart illustrating another example of the process flow of the vehicle controller according to the first embodiment.

FIG. 12 is a flow chart illustrating another example of the process flow of the vehicle controller 100 according to the first embodiment. Processing illustrated in the flowchart is performed repeatedly in a predetermined cycle, for example, after generating the action plan 138 by the processing illustrated in the flowchart of FIG. 11 or when performing the automated drive. In the processing illustrated in the flowchart, when the changeover switch 80 or operation device 78 is operated by the user such as a driver in the automated drive mode as similar to the example of FIG. 10, the control switching unit 110 interrupts and performs switching of the control mode the travel control unit 112 from the automated drive mode to the manual drive mode.

The vehicle controller 100 determines whether the vehicle M (vehicle concerned) is traveling in the automated drive mode (step S200). When the vehicle M (vehicle concerned) is not traveling in the automated drive mode, the vehicle controller 100 ends the processing illustrated in the flowchart. Meanwhile, when the vehicle M (vehicle concerned) is traveling in the automated drive mode, the external situation recognition unit 104 compares a route indicated by the route information 134 with the map information 132 and determines whether a traffic signal SIG exists on the route (step S202). When the traffic signal SIG does not exist on the route, the travel control unit 112 continues control of the control target in accordance with the action plan 138 (step S208). That is, the vehicle controller 100 continues automated drive.

Meanwhile, when the traffic signal SIG exists on the route, the external situation recognition unit 104 determines whether the traffic signal SIG is in operation (step S204). When the traffic signal SIG is not in operation, the travel control unit 112 continues control of the control target in accordance with the action plan 138 (step S208).

Meanwhile, when the traffic signal SIG on the route is in operation, the setting unit 106 changes the set automated drive mode section (step S206). Specifically, the setting unit 106 resets the destination to a position before the position of the traffic signal SIG which is identified as being in operation. When resetting the destination, the setting unit 106 may notify information indicating that the automated drive mode section is changed, for example, to a driver by using the navigation device 50 or an audio apparatus. Next, the travel control unit 112 continues control of the control target in accordance with an event in the automated drive mode section reset by the setting unit 106 (step S208).

In place of the processing in the step S206, the control mode may be temporarily switched to the manual drive mode and then returned to the automated drive mode after elapse of a predetermined period of time (or after traveling by a predetermined distance), or a bypass route may be set if the bypass route is selectable.

According to the vehicle controller 100, vehicle control method, and vehicle control program of the first embodiment described above, an automated drive may be performed more actively by equipping with the external situation recognition unit 104 that identifies the operation state of a traffic signals SIG existing on the route up to the destination, the setting unit 106 configure to set an automated drive mode section based on the operation state of the identified traffic signal SIG in the route, and the travel control unit 112 that controls traveling of the vehicle M by the automated drive mode in the automated drive mode section.

According to the vehicle controller 100, vehicle control method, and vehicle control program of the first embodiment, automated drive may be performed more easily according to the operation state of the traffic signal SIG by calculating a time when the vehicle will pass a traffic signal SIG existing on the route and setting an automated drive mode section based on the calculated time and operation time of the traffic signal SIG.

According to the vehicle controller 100, vehicle control method, and vehicle control program of the first embodiment, the operation state of the traffic signal SIG can be estimated by identifying the state of the vehicle existing within a predetermined distance before the traffic signal SIG based on traffic signal operation information acquired by the communication unit 65 from the external device 300, or position information and speed information. Consequently, the vehicle controller 100, the vehicle control method, and the vehicle control program make it easier to perform automated drive according to the operation state of the traffic signal.

Second Embodiment

Hereinafter, a vehicle controller 100, a vehicle control method, and a vehicle control program according to a second embodiment are described. A set ting unit 106 according to the second embodiment changes a section up to a next traffic signal SIG to the manual drive mode section in a case where a traffic signal SIG in operation exists on a route leading to the destination.

Figure 13:
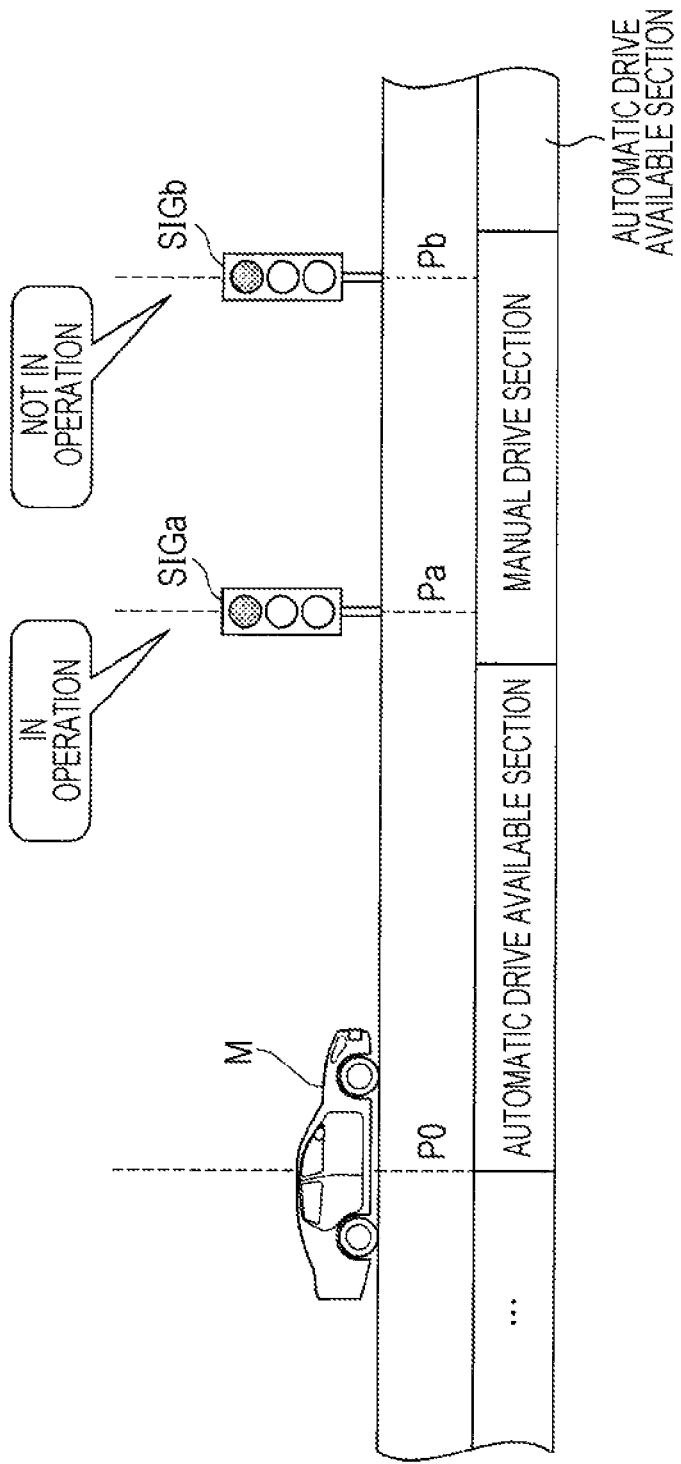
FIG. 13 is a diagram for illustrating a further other example of the method of setting the drive section.

FIG. 13 is a diagram for illustrating a further other example of the method of setting the drive section. In the example of FIG. 13, a traffic signal SIGa and a traffic signal SIGb exist in the route front the present position P0 of the vehicle M up to the destination. The external situation recognition unit 104 recognizes, for example, that the traffic signal SIGa is in operation and the traffic signal SIGb is not in operation. In such a case, the setting unit 106 sets a section from the position P0 of the vehicle M to the position Pa of the traffic signal SIGa as the automated drive mode section, and a section from a position before the position Pa of the traffic signal SIGa to a position behind the position Pb of the traffic signal SIGb as the manual drive mode section. Specifically, the setting unit 106 sets a finishing position Pfin of the automated drive mode section to a position before the position of the traffic signal SIGa in operation or to a position where automated drive ends before the vehicle M reaches the position Pa of the traffic signal SIGa, and sets a starting position of the automated drive mode section to a position behind the position of the traffic signal SIGb not in operation or to a position where automated drive starts after the vehicle M passes through the position Pb of the traffic signal SIGb.

According to the vehicle controller 100, vehicle control method, and vehicle control program of the second embodiment, automated drive may be performed in a more positively manner as similar to the first embodiment described above.

Hereinafter, other embodiment is described. When acquiring position information or speed information of the other vehicle from the external device 300, the vehicle controller 100 may transmit position information of the vehicle M (vehicle concerned) to the external device 300 and cause the external device 300 to extract only position information or speed information of a vehicle close to the position of the vehicle M (vehicle concerned) and transmit the extracted information to the vehicle M (vehicle concerned).

Although modes for embodying the present disclosure are described using embodiments, the present, disclosure is not limited to such embodiments, and various modifications and substitutions may be carried out within a scope not departing from the spirit of the present disclosure.

What is claimed is:

1. A vehicle controller for controlling a travelling of a vehicle in an automated drive mode on a route up to a destination, the vehicle controller comprising:
   a traffic signal state detector configured to detect a plurality of traffic signals existing on the route and identify an operation state of the traffic signals detected on the route, the plurality of traffic signals comprising at least a first traffic signal and a second traffic signal, the first traffic signal being closer to the vehicle than the second traffic signal on the route;
   a setting unit configured to set an automated drive mode section on the route based on the operation state of the traffic signal identified by the traffic signal state detector; and
   a vehicle travel controller configured to control the travelling of the vehicle in the automated drive mode by controlling an operation of the vehicle including acceleration, deceleration and steering thereof when the vehicle travels in the automated drive mode section set by the setting unit, wherein
   the setting unit sets the automated drive mode section such that the automated drive mode section ends in a position after the first traffic signal, but before the second traffic signal when the following conditions (i) and (ii) are met:
   (i) the first traffic signal is not in operation and in a location closest to a current position of the vehicle among the plurality of the detected traffic signals on the route at a time when the automated drive mode section is set; and
   (ii) the second traffic signal is in operation and in a location closest to the current position of the vehicle among the plurality of the detected traffic signals which are in operation on the route at the time when the automated drive mode section is set.

2. The vehicle controller according to claim 1, wherein the setting unit sets the automated drive mode section to be a section from the current position of the vehicle to a position before the second traffic signal which is in operation.

3. The vehicle controller according to claim 2, wherein the setting unit sets a predetermined distance from a position at which the automated drive mode section ends before the traffic second signal in operation to be a temporary manual drive mode section, or the setting unit changes the route so as to avoid the second traffic signal in operation.

4. The vehicle controller according to claim 1, further comprising a communication unit that communicates with an external device which provides time information indicating a time when each of the first and second traffic signals is to operate, wherein
   the setting unit calculates a time when the vehicle will pass through each of the first and second traffic signals existing on the route and sets the automated drive mode section based on the calculated time and the time information acquired by the communication unit from the external device.

5. The vehicle controller according to claim 1, further comprising a communication unit that communicates with an external device which provides information indicating a state of another vehicle existing within a predetermined distance before each traffic signal, wherein
   the traffic signal state detector identifies the operation state of the traffic signal based on the information indicating the state of another vehicle acquired by the communication unit from the external device.

6. The vehicle controller according to claim 1, further comprising a vehicle detection unit that detects a forward vehicle, wherein
   the traffic signal state detector detects a traveling state of the forward vehicle including a stopped state or a deceleration state thereof based on a detection result from the vehicle detection unit, and
   if the traffic signal state detector detects that the forward vehicle is in the stopped state or deceleration state within a predetermined distance before each traffic signal existing on the route, it identifies that the traffic signal is in operation.

7. The vehicle controller according to claim 1, further comprising an image capturing unit that captures an image of surroundings of the vehicle, wherein
   the traffic signal state detector detects an existence of each traffic signal and identifies the operation state of the traffic signal including a signal state of the traffic signal, based on the image acquired from the image capturing unit.

8. The vehicle controller according to claim 1, wherein the setting unit sets the automated drive mode section to be a section from the current position of the vehicle to the destination when the traffic signal state detector identifies that each of the traffic signals detected on the route is not in operation.

9. A vehicle control method performed by a vehicle controller for controlling a travelling of a vehicle in an automated drive mode on a route up to a destination, the method comprising the steps of:

detecting a plurality of traffic signals existing on the route and identifying an operation state of the traffic signals existing on the route, the plurality of traffic signals comprising at least a first traffic signal and a second traffic signal, the first traffic signal being closer to the vehicle than the second traffic signal on the route;

setting an automated drive mode section on the route based on the identified operation state of the traffic signals such that the automated drive mode section ends in a position after the first traffic signal, but before the second traffic signal when the following conditions are met: (i) the first traffic signal is not in operation and in a location closest to a current position of the vehicle among the plurality of the detected traffic signals on the route at a time when the automated drive mode section is set and (ii) the second traffic signal is in operation and in a location closest to the current position of the vehicle among the plurality of the detected traffic signals which are in operation on the route at the time when the automated drive mode section is set; and controlling the traveling of the vehicle in the automated drive mode by controlling an operation of the vehicle including acceleration, deceleration and steering thereof when the vehicle travels in the automated drive mode section.

10. A vehicle control program causing a computer comprising a vehicle controller to control a travelling of a vehicle in an automated drive mode on a route up to a destination, the program comprising the steps of:

detecting a plurality of traffic signals existing on the route and identifying an operation state of the traffic signals existing on the route, the plurality of traffic signals comprising at least a first traffic signal and a second traffic signal, the first traffic signal being closer to the vehicle than the second traffic signal on the route;

setting an automated drive mode section on the route based on the identified operation state of the traffic signals such that the automated drive mode section ends in a position after the first traffic signal, but before the second traffic signal when the following conditions are met: (i) the first traffic signal is not in operation and in a location closest to a current position of the vehicle among the plurality of the detected traffic signals on the route at a time when the automated drive mode section is set and (ii) the second traffic signal is in operation and in a location closest to the current position of the vehicle among the plurality of the detected traffic signals which are in operation on the route at the time when the automated drive mode section is set; and controlling the traveling of the vehicle in the automated drive mode by controlling an operation of the vehicle including acceleration, deceleration and steering thereof when the vehicle travels in the automated drive mode section.

* * * * *